United States Patent [19]

Mooney

[11] 4,362,403

[45] Dec. 7, 1982

[54] MEANS AND METHOD OF SENSING TEMPERATURE

[76] Inventor: Joseph R. Mooney, 33 Hawk St., New Orleans, La. 70124

[21] Appl. No.: 289,793

[22] Filed: Aug. 3, 1981

[51] Int. Cl.³ .............................................. G01F 23/24
[52] U.S. Cl. .......................................... 374/4; 73/295
[58] Field of Search ............. 73/40.5 R, 40, 49.2, 73/295

[56] References Cited

U.S. PATENT DOCUMENTS

| | | | |
|---|---|---|---|
| 2,211,606 | 8/1940 | Pratt | 73/295 |
| 2,279,043 | 4/1942 | Harrington | 73/295 |
| 2,702,476 | 2/1955 | De Boisblanc | 73/295 |
| 2,753,713 | 7/1956 | Mabey | 73/295 X |
| 3,111,031 | 11/1963 | Kuritza | 73/295 |
| 3,145,567 | 8/1964 | Bobrowsky | 73/295 |
| 3,279,252 | 10/1966 | Barlow | 73/295 |
| 4,065,967 | 1/1978 | Beeston | 73/295 |

*Primary Examiner*—Steven L. Stephan
*Assistant Examiner*—Joseph W. Roskos
*Attorney, Agent, or Firm*—Walker & McKenzie

[57] ABSTRACT

Leaks are detected in liquid storage reservoirs by detecting any change in the level of liquid in the reservoir while monitoring the temperature of the liquid. The improvement of the present invention involves positioning a series of thermistors at strategic locations in the liquid and using an extremely sensitive, digital readout ohmmeter to individually detect the resistance characteristics of each thermistor.

6 Claims, 2 Drawing Figures

MEANS AND METHOD OF SENSING TEMPERATURE

BACKGROUND OF THE INVENTION

1. Field of the Invention

The present invention relates to means for and methods of detecting leaks in tanks for storing gasoline, oil and the like.

2. Description of the Prior Art

Leakage of a small amount of liquid from underground liquid storage reservoir such as used to store gasoline in typical petroleum service stations and the like is difficult to efficiently determine. However, the National Fire Protection Association considers any such leakage of over 1.2 gallons per day to be intolerable. Heretofore, a number of procedures and devices have been used to detect leaks in liquid storage reservoirs. Among these prior procedures and devices are those that measure product temperature changes during test periods so that expansion or contraction of the liquid might be taken into consideration and related to changes in liquid volume and/or level in determining whether or not a reservoir is leaking. White, U.S. Pat. No. 3,580,055 discloses the use of a single electronic temperature responsive sensing device (thermistor) in an electrical and/or electronic circuit and requires a fluid circulating system which continuously circulates fluid from the tank and back to equalize the temperature of the fluid in the tank and permit compensation for temperature variations in the system.

The present invention is an improvement of the inventor's prior leak detecting system for which U.S. Pat. No. 4,186,591 issued. The system taught by U.S. Pat. No. 4,186,591 includes means for measuring any change in the level of liquid in a liquid storage reservoir over a certain period of time and means for measuring any change in the temperature of the liquid in the reservoir over the same period of time. The temperature sensing means described in U.S. Pat. No. 4,186,591 includes a single thermistor element (it was pointed out in U.S. Pat. No. 4,186,591 that a plurality of thermistor elements could be used), a source of electrical power and means for measuring the amount of electrical power passing through the thermistor element.

SUMMARY OF THE INVENTION

The present invention is directed towards providing an improved temperature sensing apparatus for use in a system for detecting leaks in a liquid storage reservoir of the type including an apparatus for indicating the level of liquid in the reservoir and including a temperature sensing apparatus for indicating the temperature of the liquid in the reservoir. The concept of the present invention includes placing a plurality of temperature sensing means at a plurality of locations within the liquid and selectively measuring the temperature sensed by each of the plurality of temperature sensing means to arrive at an average temperature within the liquid storage reservoir.

The improved temperature sensing apparatus of the present invention comprises, in general, a plurality of temperature sensing means; a sensitive electrical meter means for indicating minute electrical characteristics; an electric circuit for electrically coupling the temperature sensing means and the meter means; and selector switch means interposed in the electric circuit between the temperature sensing means and the meter means for allowing each of the temperature sensing means to be individually coupled to the meter means.

DESCRIPTION OF THE PREFERRED EMBODIMENT

Figure 1:
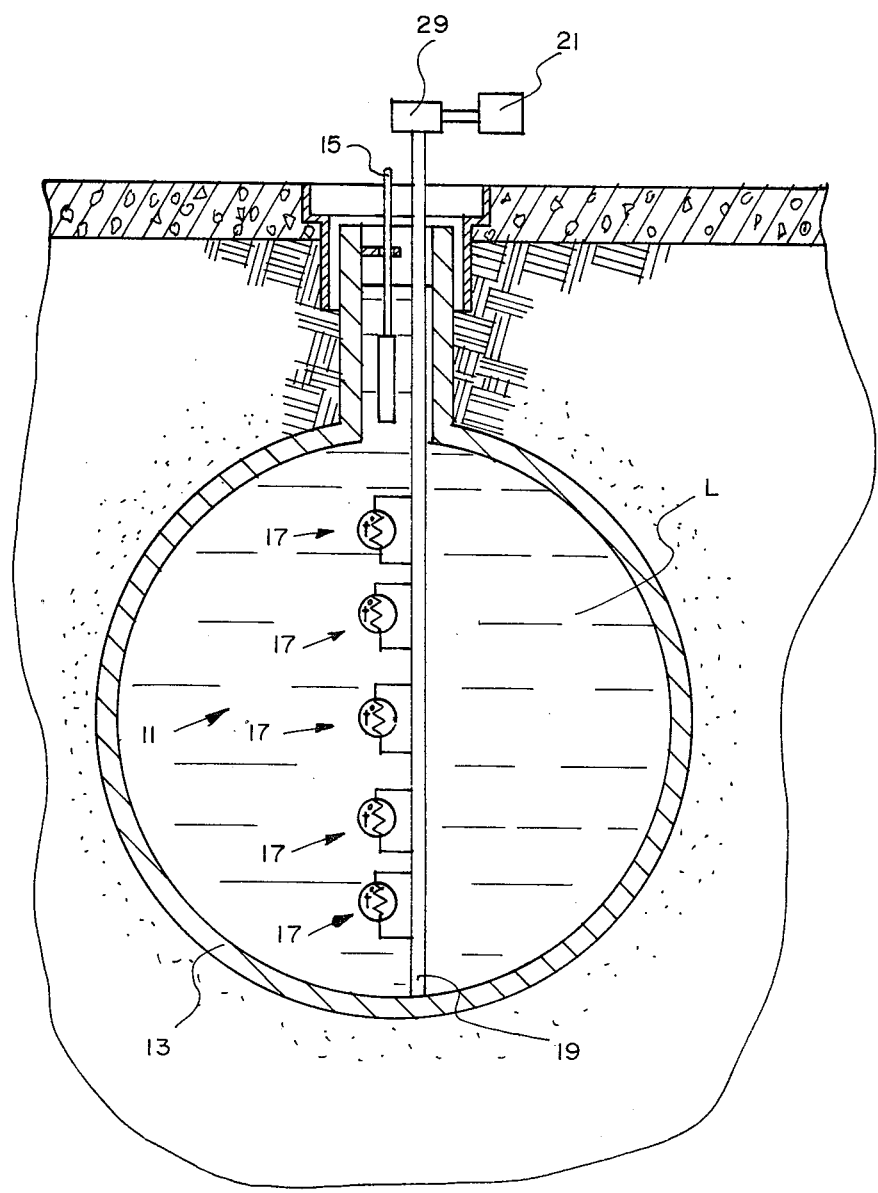
FIG. 1 is a somewhat diagrammatic section view of a portion of a fluid storage reservoir in combination with the improved temperature sensing apparatus of the present invention.
Figure 2:
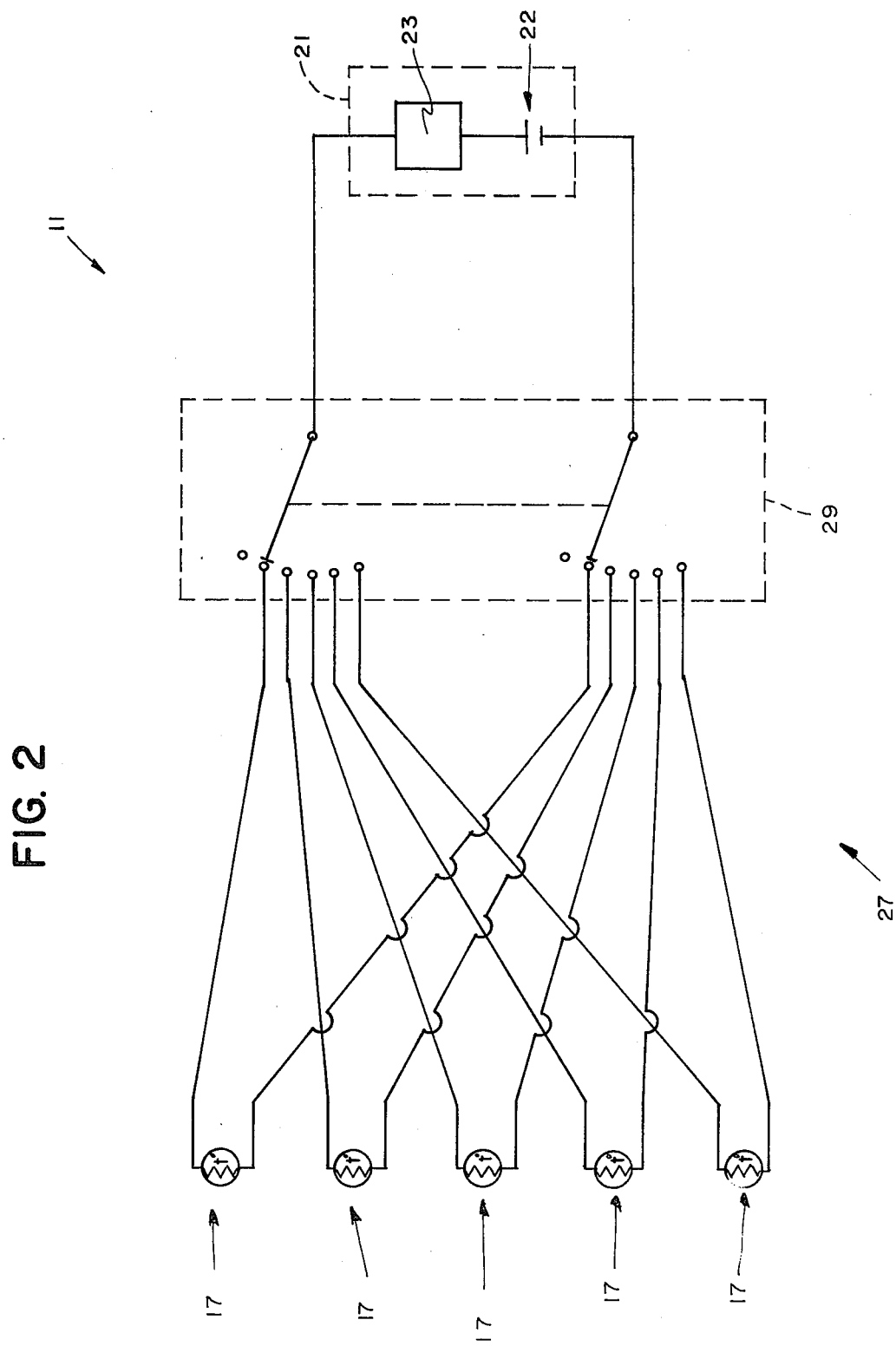
FIG. 2 is an electrically schematic view of the improved temperature sensing apparatus of the present invention.

The improved temperature sensing apparatus 11 of the present invention is for use in a system for detecting leaks in a liquid storage reservoir 13 of the type including an apparatus for indicating the level of liquid L in the reservoir 13 and a temperature sensing apparatus for indicating the temperature of the liquid L in the reservoir 13. The reservoir 13 may consist of an underground storage tank commonly used in petroleum service stations and the like as indicated in FIG. 1. The apparatus for indicating the level of liquid L in the reservoir 13 may consist of a float means 15 as diagrammatically shown in FIG. 1 and as fully disclosed in Mooney, U.S. Pat. No. 4,186,591.

The improved temperature sensing apparatus 11 of the present invention includes a plurality of temperature sensing means 17 for placement at a plurality of locations in the liquid L within the reservoir 13 as shown in FIG. 1. The temperature sensing means 17 display measurable electrical characteristics responsive to the temperature of the liquid L. More specifically, each temperature sensing means 17 may consist of a well-known thermistor such as the type manufactured by Fenwal Electronics of 63 Fountain St., Framingham, Mass. 01701. A thermistor is a "thermal resistor" with a high negative temperature coefficient of resistance whose resistance decreases as the temperature increases and whose resistance increases as the temperature decreases. Thus, each temperature sensing means 17 will have electrical resistance characteristics responsive to, and changing with (preferably portionally and lineally), changes in the temperature of the liquid L. The temperature sensing means 17 are preferably located at appropriate, strategic locations throughout the liquid L so that the overall average temperature, or average change in temperature, can be determined by the temperature sensing apparatus 11. Because of the fact that it is difficult, if not impossible to determine which specific location in the liquid L is truly representative of the average temperature of the liquid L, the plurality of temperature sensing means 17 measure the temperature (and/or temperature change) at a number of locations. As a general rule, it may be concluded that the greater the number of locations, the greater the accuracy of the determination of average temperature. Of course, there is a practical, economic limit to the number of temperature sensing means 17 that can be used. The optimum number depends upon many factors. In typical 10,000 gallon underground liquid storage reservoir in a gasoline service station of the like, five temperature sensing means or thermistors 17 of equal resistance (e.g., 10,000 ohms) strategically located should be a sufficient number, but more or fewer could be used. Five temperature sensing means 17 are shown in FIG. 1 as an example. The plurality of temperature sensing means 17 are preferably located at the vertical centers of equal volumes of liquid L in the reservoir 13. For example, in a 10,000 gallon reservoir 13, using five temperature sensing means 17 as shown in FIG. 1, each temperature sensing means 17 is preferably located at the vertical center of each of 2,000 gallons of liquid. It will be noted that because of the horizontal cylindrical shape of a typical underground liquid storage reservoir, the vertical distance between each of the plurality of temperature sensing means 17 will vary to position the temperature sensing means 17 at the vertical centers of equal volumes of liquid. Such an arrangement of temperature sensing means 17 provides a very accurate, representative composite of temperature changes which may occur during a certain period of time. Thus, because of the horizontal, cylindrical shape of the tank, the temperature sensing means 17 shown in FIG. 1 are not spaced at uniform vertical dimensions intervals but, in the case of a 10,000 gallon reservoir 13, the spacing would correspond with levels of 1000, 3000, 5000, 7000 and 9000 gallons to locate each temperature sensing means 17 at the vertical centers of equal volumes of 2000 gallons. the specific vertical location of each of the sensing means 17 can be easily determined by well-known mathematical formulas to properly position the sensing means 17 at such vertical centers of equal volume in a manner which will be apparent to those skilled in the art. To ensure proper positioning of the temperature sensing means 17, each temperature sensing means 17 may be mounted on a rigid body member 19 such as a hollow, elongated pipe or the like at proper spacing so as to properly position the temperature sensing means 17 in the liquid L.

The improved temperature sensing apparatus 11 of the present invention includes a sensitive electrical meter means 21 for indicating minute electrical characteristics. The electric meter means 21 is preferably a standard digital readout volt/ohm meter, the internal control circuitry of which emits a constant current, resulting in a voltage drop across any temperature sensing means 17 connected thereto that is directly proportional to the resistance of that specific temperature sensing means 17. Such an electrical meter means 21 includes, in general, a source of electrical energy such as a typical battery 22 and a well-known ohm meter 23 having a readout calibrated in resistance units (ohms) whereby the readout of the ohm meter 23 can be related to the temperature of the liquid L adjacent the specific temperature sensing means 17 and whereby any change in the resistance indicated can be related to change in temperature of the liquid L adjacent that specific temperature sensing means 17. The readout of the ohm meter 23 is preferably digital to allow a more accurate, precision measurement of resistance. Such an electrical meter means 21 is the model 255 LCD multimeter sold by Data Precision, a division of Analogic Corporation, Electronics Ave., Danvers, Mass. 01923.

The improved temperature sensing apparatus 11 of the present invention also includes an electric circuit 27 for electrically coupling the temperature sensing means 17 and the meter means 21. The electric circuit 27 may simply consist of a plurality of electrically conducive wires extending from each temperature sensing means 17 to the electric meter 21. It should be noted that a portion of the electric circuit 27 may extend from the temperature sensing means 17, through the body member 19 to a position outside the reservoir 13.

The improved temperature sensing apparatus 11 of the present invention also includes a selector switch means 29 interposed in the electric circuit 27 between the temperature sensing means 17 and the meter means 21 to allow each of the temperature sensing means 17 to be individually electrically coupled to the meter means 21 whereby the meter means 21 can be used to determine the temperature of the liquid L adjacent each temperature sensing means 17 to arrive at an average temperature. The selector switch means 29 may be constructed in various manners well-known to those skilled in the art depending upon the number of temperature sensing means 17 and the like.

The method of measuring the temperature of the liquid L in the liquid storage reservoir 13 using the temperature sensing apparatus 11 is quite simple. First, the plurality of temperature sensing means 17 are placed within the liquid L at strategic locations within the liquid L. Next, the selector switch means 29 is set so that the resistance of each of the temperature sensing means 17 can be individually measured by the meter means 21 to determine the average temperature of the liquid L in the reservoir 13.

Although the present invention has been described and illustrated with respect to a preferred embodiment thereof and a preferred method of use thereof, it is not to be so limited since changes and modifications can be made therein which are within the full intended scope of the invention.

I claim:

1. An improved temperature sensing apparatus for sensing temperature in a system for detecting leaks in a liquid storage reservoir of the type including an apparatus for indicating the level of liquid in the reservoir and a temperature sensing apparatus for indicating the temperature of the liquid in the reservoir, said improved temperature sensing apparatus comprising:
   (a) a plurality of temperature sensing means for placement at a plurality of locations within the liquid and for displaying measurable electrical characteristics responsive to the temperature of the liquid;
   (b) a sensitive electrical meter means for indicating minute electrical characteristics;
   (c) an electric circuit for electrically coupling said temperature sensing means and said meter means; and
   (d) selector switch means interposed in said electric circuit between said temperature sensing means and said motor means for allowing each of said temperature sensing means to be individually electrically coupled to said meter means.

2. The improved temperature sensing apparatus of claim 1 in which each of said temperature sensing means is located substantially at the vertical centers of equal volumes of the liquid in the reservoir for sensing the average temperature of the liquid in the reservoir.

3. The improved temperature sensing apparatus of claim 2 in which each of said temperature sensing means includes a thermistor.

4. The improved temperature sensing apparatus of claim 3 in which said electric meter includes a digital readout means for allowing precise reading of the resistance exerted by said thermistors.

5. An improved method of measuring the temperature of liquid in a liquid storage reservoir for use in a method of detecting leaks in a liquid storage reservoir of the type including the steps of measuring any change in the level of the liquid in the reservoir and measuring any change in the temperature of the liquid in the reservoir, said improved method including the steps of:
  (a) placing a plurality of thermistors at strategic locations within the liquid in the reservoir;
  (b) individually measuring the resistance of each of said thermistors to determine the average temperature of the liquid in the reservoir.

6. The improved method of claim 5 in which the step of measuring the resistance of each of said thermistors includes the use of a sensitive electrical meter means for indicating minute resistance characteristics of said thermistors, and includes the use of selector switch means for allowing each of said thermistors to be individually electrically coupled to said meter means.

* * * * *